US006553100B1

(12) United States Patent
Chen et al.

(10) Patent No.: US 6,553,100 B1
(45) Date of Patent: Apr. 22, 2003

(54) INTELLIGENT ALERTING SYSTEMS

(75) Inventors: Jennifer H. Chen, Freehold, NJ (US); Jerry Leger, Woodmere, NY (US); Robert J. Sayko, Colts Neck, NJ (US)

(73) Assignee: AT&T Corp., New York, NY (US)

( * ) Notice: Subject to any disclaimer, the term of this patent is extended or adjusted under 35 U.S.C. 154(b) by 268 days.

(21) Appl. No.: 09/707,863

(22) Filed: Nov. 7, 2000

(51) Int. Cl.[7] .............................................. H04M 11/00

(52) U.S. Cl. ........................................... 379/37; 379/45

(58) Field of Search ............................. 379/37, 38, 39, 379/45, 46, 102.02, 102.03, 102.04, 106.02, 201.02, 207.12; 348/552, 563; 340/531

(56) References Cited

U.S. PATENT DOCUMENTS 5,512,935 A * 4/1996 Majeti et al. .................. 348/9
5,805,670 A * 9/1998 Pons et al. .................... 379/45
5,930,702 A * 7/1999 Goldman et al. ........... 379/211
6,151,385 A * 11/2000 Reich et al. .................. 379/45
6,204,761 B1 * 3/2001 Vanderable ................. 340/539

* cited by examiner

*Primary Examiner*—Stella Woo

(57) ABSTRACT

This invention provides for intelligent alerting systems that receive a notification, such as an incoming message or the like or indication thereof, or an indication of an abnormal condition, such as a device malfunction, a burglary attempt, or the like and alert end-users via one or more devices, including one or more enhanced performance reproduction devices such as an enhanced television or an enhanced radio. The systems include an intelligent processor that determines whether the one or more enhanced performance reproduction devices are reproducing a performance, and transmits an alert when a performance is being reproduced. The systems may also transmit an alert to other devices, such as pagers, telephones, personal computers, etc. When the notification indicates an abnormal condition, the systems may perform countermeasures, such as turning off a malfunctioning device, calling the police or the like.

3 Claims, 7 Drawing Sheets

INTELLIGENT ALERTING SYSTEMS

BACKGROUND OF THE INVENTION

1. Field of Invention

This invention relates to systems for intelligently alerting end-users of events of interest.

2. Description of Related Art

Methods are available to alert end-users of events such as incoming messages and/or abnormal situations. These methods usually require an end-user to be carrying, or be near to, a specified alerting device, such as a pager or a telephone. Better methods and systems are needed to alert end-users.

SUMMARY OF THE INVENTION

This invention provides for an intelligent alerting system that receives a notification and alerts end-users via one or more devices. The system includes an intelligent processor that determines whether any of the devices are active. If active, the intelligent processor includes the active device as a possible device for an alert transmission.

Thenotification may be or indicate an incoming message or the like, or may indicate an abnormal condition, such as a device malfunction, a burglary attempt, or the like. When the notification indicates an abnormal condition, the system may perform countermeasures, such as turning off a malfunctioning device, calling the police, the fire department, etc.

BRIEF DESCRIPTION OF THE DRAWINGS

The invention is described in detail with reference to the following figures, wherein like numerals reference like elements, and wherein.

DETAILED DESCRIPTION OF PREFERRED EMBODIMENTS

This invention provides for an intelligent alerting system that transmits an alert to one or more end-user devices.

When a message is received for an end-user, the intelligent alerting system may search for devices associated with the end-user to detect whether any of the devices are active (i.e., being actively used). If so, then those active devices may be selected as possible devices that may be destinations of alerts generated by the intelligent alerting system. For example, if the intelligent alerting system received a message and detects that a television (enhanced) is on, then the intelligent alerting system may transmit an alert message to the television to be displayed in a window, for example. Thus, when watching television, the end-user may be alerted of the incoming message.

The intelligent alerting system may scan through a first list of devices stored in an end-user profile, for example. A second list of all the devices that are active may be compiled and the intelligent alerting system may select devices based on this second list as destinations for alert messages to alert the end-user. For example, if a television, a telephone and a personal digital assistant (PDA) are all detected to be active, the intelligent alerting system may choose to transmit the alert message to the PDA, since the end-user is most likely using the PDA while others could be using the telephone or watching the television. The intelligent alerting device may also send the alert message to the television and initiate a telephone call to the telephone after the telephone goes on hook based on information in the end-user profile, for example.

In addition, the devices of the end-user may be grouped based on a common property, such as geographic locations or the like, and the intelligent alerting system may determine where the end-user may be located based on which geographical location is associated with active devices. The intelligent alerting system may then transmit an alert message to a preferred device selected by the end-user for that geographical location. Thus, the intelligent alerting system makes a likelihood of success evaluation before transmitting alert messages so that an optimal probability of success may be achieved in alerting the end-user.

Figure 1:
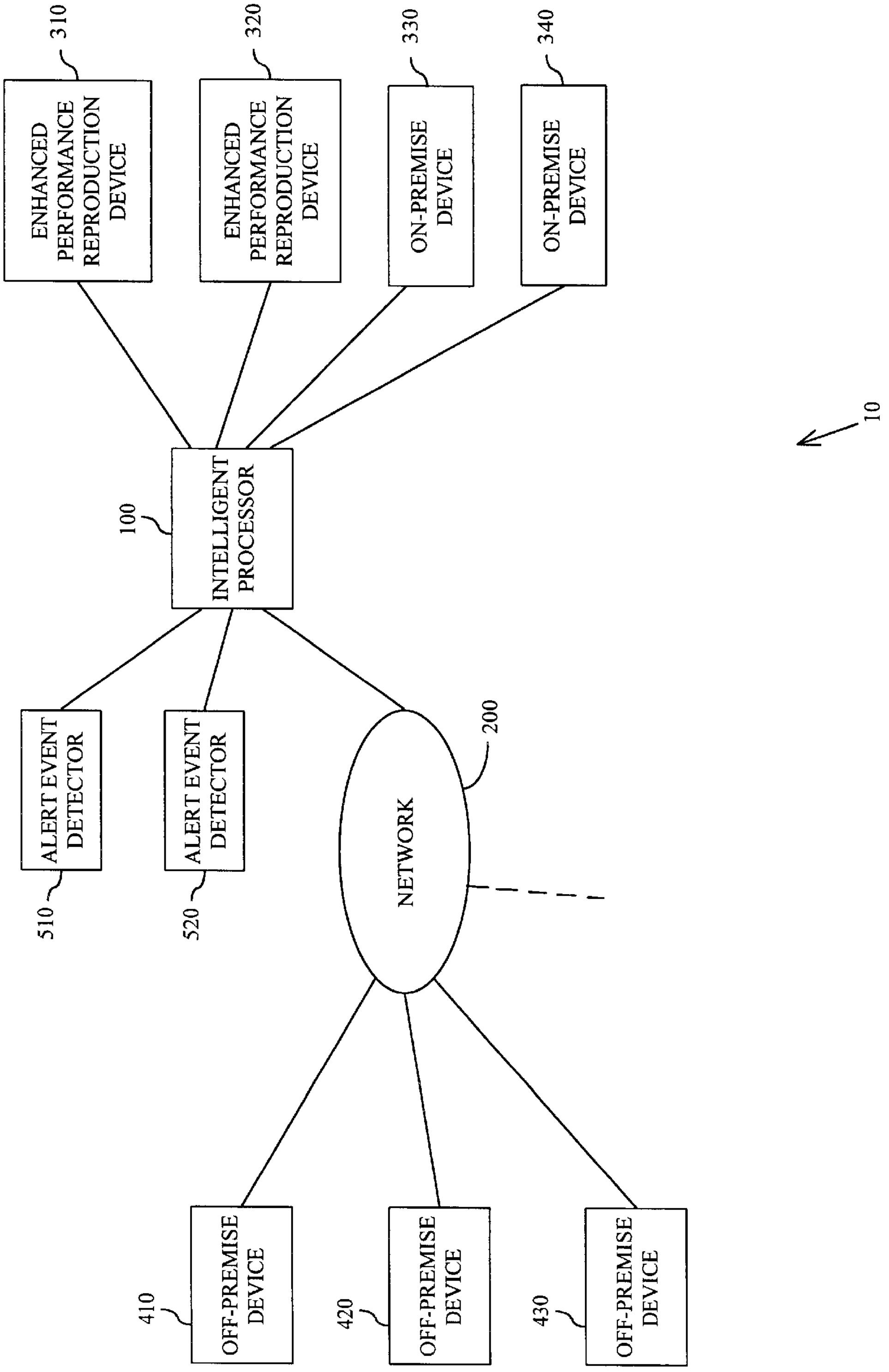
FIG. 1 shows an exemplary diagram of an intelligent alerting system.

FIG. 1 shows an exemplary diagram of an intelligent alerting system 10. The intelligent alerting system 10 includes an intelligent processor 100 coupled to enhanced reproduction devices 310 and 320, on-premise devices 330 and 340, alert event detectors 510 and 520, and a network 200. The network 200 is further coupled to off-premise devices 410, 420 and 430. The network 200 may include a plurality of different types of networks, such as a Public Switched Telephone Network (PSTN), a cellular network, a data network, an Internet Protocol (IP) network, an Asynchronous Transfer Mode (ATM) network, a circuit switched network, a Voice-Over Internet Protocol (VOIP) network, a radio or television broadcasting network, a cable network, and or the like, interlinked together, for example.

The intelligent processor 100 may be located at any desired location, either on-premise or off-premise. Although the intelligent processor 100 is shown directly connected to on-premise devices, it may be connected to on-premise devices via the network 200.

An end-user of the intelligent alerting system 10 may have access to many different services. For example, the end-user may have subscribed to a cellphone service, a pager service, an Internet service that receives e-mails via the Internet, and other types of services such as a system calendar with automated reminders and airline services that provide for flight change notification. The end-user may also use on-premise detection/alerting systems such as a burglary alarm system, a fire alarm system, a washing machine overflow alert system, an elders emergency alarm system, a kitchen appliance malfunction alarm system, and/or the like. The end-user also likely has access to standard household devices such as a telephone, a radio and a television set. The intelligent alerting system 10 makes intelligent use of such resources to efficiently and effectively alert end-users of various types of alert events.

When e-mail is received for an end-user, for example, the intelligent processor 100 determines where the end-user can most likely be reached. This determination can be made by, for example, determining whether a television set or radio is turned on, whether a telephone is off-hook, and/or by consulting one or more profiles. The profiles may include, for example, device capability information, such as information indicating whether a device is an enhanced device that can receive and transmit an alert and/or message, and/or whether a device can perform a countermeasure, as described below, when the alert event is an abnormal condition; device location information, such as information indicating where a device is geographically located, and/or where the device is located relative to other devices (e.g., which devices are located in the same room, etc.); end-user schedule information, such as information indicating when a user will be at home, when and/or where a user will be traveling, and/or the like; and end-user message and/or routing preference information, such as information designating how an incoming message and/or alert should be handled based on who or where it is from, for example.

The intelligent processor 100 may scan possible alert devices by, for example, sending a query to determine a status of one or more potential alert devices, e.g., the enhanced performance reproduction devices 310 and 320, the on-premise devices 330 and 340, and the off-premise devices 410–430, and/or retrieving a list of potential alert devices from a database or the like. The query may, for example, be a status check message, a ping, a call or the like. In response, one or more of the potential alert devices may return a response to the query, indicating the status. For example, if a potential alert device is active, the potential alert device may return a response indicating that it is active.

Furthermore, the intelligent processor 100 may group the potential alert devices into groups based on a common property, such as geographical location, of the potential alert devices. For example, a television, computer and telephone located in the same room may be grouped together. Then, if the intelligent processor 100 is unable to transmit an alert to one of the devices in a group, it may attempt to transmit an alert to another of the devices in the group. For example, if the telephone is off-hook and cannot receive an alert, the processor 100 sends an alert to another device in the same group, e.g. the television. There is a high probability that the alert will be successfully received, because the off-hook condition of the telephone presents a strong indication that an end-user is in the same room as the television.

If the enhanced performance reproduction device 310 is an enhanced television, described in detail below, and the intelligent processor 100 detects that the enhanced performance reproduction device 310 is on, it is likely that an end-user is watching television. Therefore, the intelligent processor 100 transmits an appropriate alert to the television, such as a red flashing screen display, overlaid text, an audible signal (such as a beep, a synthesized or pre-recorded voice message or the like), or the like. The alert may be a message that identifies the sender and may include a summary of a received communication. For example, for e-mail, the alert may include a title and a sender ID of the e-mail. For voice communication such as a telephone call, the alert may provide caller ID information such as is available from Automatic Name Identification (ANI).

If the enhanced performance reproduction device 310 is not turned on, the intelligent processor 100 determines whether any other enhanced performance reproduction devices are turned on. If so, the intelligent processor 100 transmits an appropriate alert. For example, if the enhanced performance reproduction device 320 is an enhanced radio and is turned on, the intelligent processor 100 may overlay a beep over the radio transmission, or may cause the enhanced radio to automatically tune to a reserved frequency to receive a transmitted message.

Alternatively, if the enhanced performance reproduction device 310 is not turned on, the intelligent processor 100 may transmit a signal that turns on the enhanced performance reproduction device 310. The intelligent processor 100 may then transmit an appropriate alert as described above.

When an end-user is actually watching/listening to the turned-on enhanced performance reproduction device 310 or 320, the end-user may acknowledge the alert by, for example, pushing a button on the enhanced performance reproduction device 310 or 320 or on a remote control unit. Based on this acknowledgment, the intelligent processor 100 may determine that an end-user has been successfully alerted and may cease transmitting the alert and, if the alert event is an incoming message, for example, begin transmitting the incoming message.

It is conceivable that a person other than a designated end-user may acknowledge the alert. For example, if the end-user's brother-in-law is visiting the end-user and watching the end-user's television set, the brother-in-law may, either willfully or unintentionally, acknowledge an alert directed to the end-user. If the alert indicates an incoming message, for example, the end-user may wish to view the incoming message privately. For such situations, it may be necessary or desirable to add one or more levels of security, for example by requiring a code, such as the end-user's Personal Identification Number (PIN) or the like, to be input, in order to properly acknowledge the alert.

If no enhanced performance reproduction devices are on, the intelligent processor may attempt to alert an end-user via on-premise device 330 and/or on-premise device 340. For example, the on-premise device 330 may be an intercom system, and the intelligent processor 100 may send a pre-recorded or synthesized voice message over the intercom system. In this case, the user may, for example, acknowledge the alert by pushing a button on a portable remote control unit or on an intercom box. The on-premise device 340 may, for example, be a telephone, and if the telephone is off-hook, the intelligent processor 100 may transmit a call-waiting signal, and if the telephone is on-hook, the intelligent processor may ring the telephone and transmit a voice message if an end-user answers the telephone. In this case, the off-hook status of the telephone may serve as an end-user's acknowledgment of the alert. If the subscriber to the telephone service does not include any of the advanced features, such as call-waiting or the like, the intelligent processor 100 may wait until the telephone goes on-hook and then initiate a call to the telephone. Other on-premise devices may include a personal computer to which an instant message can be sent, for example.

If no acknowledgment is received in response to an alert transmitted to on-premise devices 330 and 340, the intelligent processor 100 may attempt to alert an end-user at off-premise devices 410, 420 and/or 430 via the network 200, and may consult a profile to determine most appropriate ones of the off-premise devices at which to locate the end-user. It should be appreciated that consultation of the profile may be performed before or instead of transmitting an alert to the on-premise devices.

For example, the off-premise device 410 may be an enhanced television located at the end-user's relative's house across the country, and the user may have updated the profile to indicate that he or she will be visiting the relative during his or her vacation. In this case, the intelligent processor transmits an alert to the relative's television and receives an acknowledgment in the same manner as described above.

The off-premise device 420 may be a pager, for example, and the alert may be a voice, text, audible or other-sensory page. An end-user receiving such a page may call the intelligent processor 100 using any available telephone to acknowledge the alert, and then be presented with options such as listening to a caller's message, being connected with a calling party who is still on the line, hearing a synthesized reproduction of a text message (such as an e-mail message), or the like. Alternatively, the end-user may simply respond directly to the page by, for example, calling back a calling party or logging on to an e-mail server to retrieve an e-mail message without returning an acknowledgment to the alert.

The off-premise device 430 may, for example, be a wireless telephone to which the intelligent processor 100 transmits a call-waiting signal, if the telephone is off-hook. If the telephone is on-hook, the intelligent processor may ring the telephone and transmit a voice message if an end-user answers the telephone. In this case, the off-hook status of the telephone may serve as an end-user's acknowledgment of the alert.

Many other off-premise alerting devices are possible. For example, an end-user's enhanced car radio could be used as an alerting device, similar to the above description of an on-premise enhanced radio.

In addition to receiving indications of events, such as incoming messages, from the network 200, the intelligent processor 100 may receive indications of events from alert event detectors 510 and/or 520. These alert event detectors 510 and 520 may, for example, be a burglary alarm system, a fire alarm system, a washing machine overflow alert system, an elders emergency alarm system, a kitchen appliance malfunction alarm system, and/or the like. When the intelligent processor 100 detects an alert event via one of these devices, the intelligent processor 100 may attempt to alert an end-user as described above, and/or may take other appropriate, more direct action. For example, when the alert event detector 510 is a burglary alarm system and detects a burglary attempt, the intelligent processor 100 may, upon receiving a signal from the alert event detector 510, directly call the police department and play a pre-recorded or synthesized message, such as "A burglary is in progress at 6701 Ash Street. Unauthorized entry is being attempted through the first-floor window on the East side of the house."

As another example, if the alert event detector 520 is a detector that detects that a washing machine is overflowing, and if the intelligent processor 100 is equipped with a countermeasure device, as described below, the intelligent processor 100 may implement a countermeasure such as turning off power to the washing machine.

Although the alert event detectors 510 and 510 are shown directly coupled to the intelligent processor 100 in FIG. 1, it should be appreciated that alert event detectors may also be coupled to the intelligent processor 100 via the network 200. For example, if the end-user owns a restaurant, an alert event detector such as a burglary alarm or fire alarm may be located in the restaurant and coupled to the intelligent processor 100 via the network 200.

While the above description provides for specific examples of services that generate alerts, other sources of alerts may also be possible. For example, the end-user may subscribe to a calendar service that generates an alert based on prespecified circumstances. The alert may be a message that contains an appointment time and names of parties of the appointment. The end-user may have made flight reservations with an airline that offers flight schedule change alerts. Thus, if a flight schedule has changed, an alert may be generated that indicates a new departure time, for example. The end-user may also instruct the intelligent processor 100 to alert a party at the landing location to indicate arrival time changes to inform the party when to pick up the end-user, for example. Thus, there may be many sources for alerts and these events are processed by the intelligent processor 100 as described below.

Furthermore, it should be appreciated that an abnormal condition may be detected by inactivity of a given device. For example, as described in detail in U.S. Pat. application Ser. No. 09/013,779, the disclosure of which is incorporated herein by reference in its entirety, extended inactivity of a device such as a grandmother's telephone or the like may indicate an abnormal condition of which an end-user wishes to be alerted.

Figure 2:
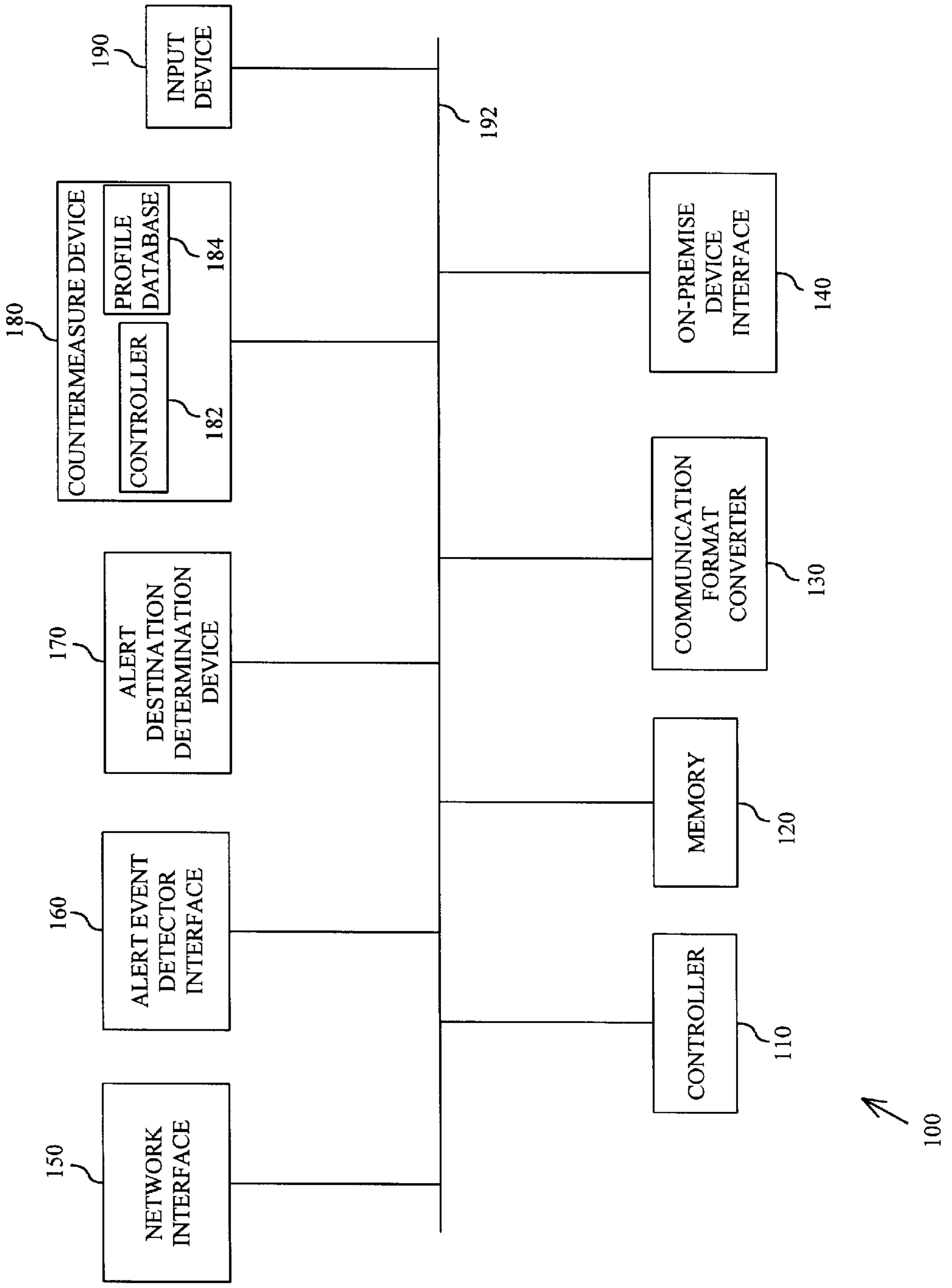
FIG. 2 shows an exemplary block diagram of an intelligent processor.

FIG. 2 shows an exemplary block diagram of the intelligent processor 100. The intelligent processor 100 includes a controller 110, a memory 120, a communication format converter 130, an on-premise device interface 140, a network interface 150, an alert event detector interface 160, an alert destination determination device 170, a countermeasure device 180, and an input device 190, all of which may be coupled together via a signal bus 192. While FIG. 2 shows a bus architecture, other hardware configurations may also be possible as is well known in the art. In addition, while FIG. 2 shows the controller 110, the alert destination determination device 170 and the countermeasure device 180 as separate units, the functions performed by these units may be combined or may be further divided among specific processors such as digital signal processors and/or performed by dedicated hardware such as application specific integrated circuits (ASIC) or other hardware implementations such as PLD, PAL or PLAs, for example.

When a notification is received via the network interface 150 or the alert event detector interface 160, the alert destination determination device 170 determines whether and to where an alert should be sent. In making this determination, the alert destination determination device 170 may detect via the on-premise device interface 140 or the network interface 150 whether any enhanced performance reproduction devices are on or active, and/or may consult a profile, as described below. If the alert destination determination device 170 determines that an alert is to be transmitted to a device that requires format conversion, such as speech-to-text or text-to-speech, audio or video synthesis, etc., the communication format converter 130 performs appropriate conversion and/or synthesis. The communication format converter 130 may perform conversion to the alert itself and/or to a message that follows the alert, such as an incoming message directed to an end-user. The communication format converter 130 is shown as part of the intelligent processor 100, but may alternatively or additionally be provided as part of a device, such as an enhanced radio or television, connected to the intelligent processor 100.

For example, if a telephone call was received for the end-user and the end-user may only be reached via the Internet, the communication format converter may perform text-to-speech and speech-to-text conversions and connect the calling party with the end-user's Internet logon so that the end-user may communicate with the caller via an Internet access terminal. The reverse situation may also be achieved if the subscriber is available via a telephone while the other communicating party is using a text terminal such as a personal digital assistant (PDA). Thus, the communication format converter may alert the subscriber via an appropriate device and may serve as a critical communication link between the subscriber and the other communicating party.

The countermeasure device 180 may include a controller 182 and a profile database 184. The profile database 184 stores profiles that indicate, for example, what countermeasure options are available for a given device. For example, if is possible to cut off power to a device, such as a washing machine, a profile indicating this capability will be stored in the profile database 182. If a burglary alarm is located in the end-user's family-owned restaurant and if the police can be called automatically in response to a burglary attempt indication from the burglary alarm, this information can also be stored in a profile in the profile database 184. User preferences, such as whether the possible countermeasure(s) should be taken immediately or whether the end-user should first be consulted, may also be indicated in a profile stored in the profile database.

Based on the profile(s) in the profile database 184, the controller 182 of the countermeasure device 180 determines whether any countermeasures are to be performed in response to an event; and if countermeasures are to be performed, the countermeasure device 180 transmits one or more countermeasure commands via the on-premise device interface 140 or the network interface 150. The determination may be automatic or may be based on user input received through the network interface 150, for example. If the event is an overflowing washing machine, for example, the countermeasure device 180 may automatically cut off power to the washing machine. This scenario would require a switch (not shown) interposed between the washing machine and a power supply and/or water supply and controlled by the countermeasure device 180.

If the notification is received via the alert event detector interface 170 and indicates a burglary attempt at the end-user's restaurant, for example, the countermeasure device 180 may, once the end-user has been successfully alerted, present the end-user with an option of whether to call the police. For example, the countermeasure device 180 may play a pre-recorded message such as "Please press '1' to call the police, or '2' to end this sequence." The end-user may remember that he has sent his nephew to the restaurant after hours to retrieve a forgotten item, and has neglected to deactivate the alarm. In this case, the end-user would preferably press "2" to end the sequence without calling the police.

The input device 190 may be provided, if necessary or desirable, to enable a user to directly input commands to the intelligent processor 100. These commands may include commands to update a profile stored in one of the above-described profile databases, commands to respond to an event (such as entering an "end sequence" command in the above-described burglary alarm situation), or the like.

The controller 110 exerts control as needed for the operation of the other components of the intelligent processor 100, and the memory 120 stores any necessary programs or the like of the intelligent processor 100. The memory 120 may also serve as a buffer for incoming/outgoing information.

Figure 3:
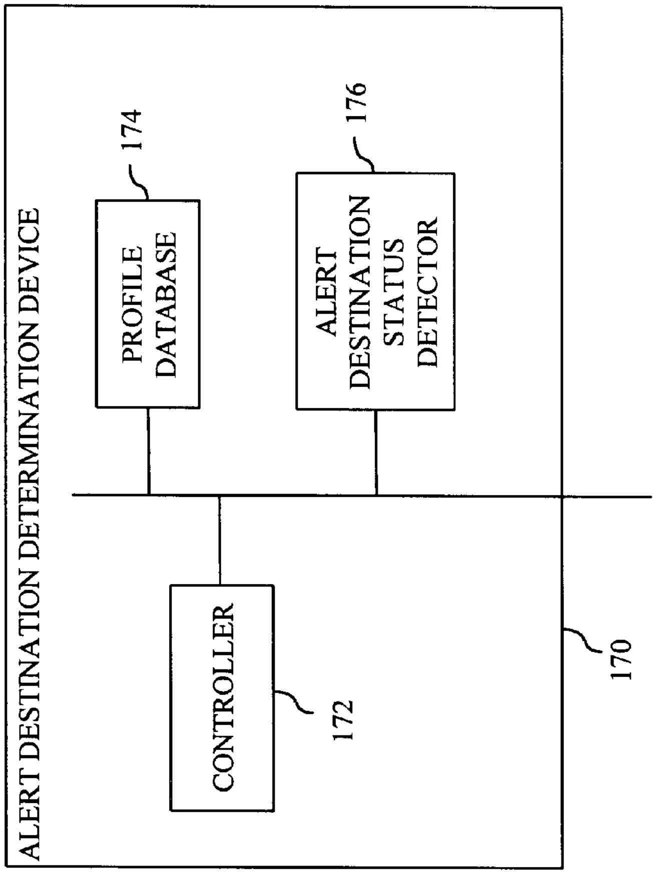
FIG. 3 shows an exemplary block diagram of an alert destination determination device.

FIG. 3 shows an exemplary block diagram of the alert destination determination device 170. The alert destination determination device 170 may include a controller 172, a profile database 174 and an alert destination status detector 176. The profile database 174 stores one or more user profiles that indicate where and when an end-user may be reached by a given device. The profile database 174 may be accessed and programmed and/or updated by the end-user via the network 100. For example, if the end-user will be out of town on vacation, the end-user may modify his or her profile in the profile database 174 by adding a new alert device, e.g. a hotel room telephone or the like, as a device through which he or she may be contacted. As other examples, the end-user may program or modify a preferred order in which an alert should be transmitted to alert devices, specify times during which the end-user will be near certain alert devices, specify appropriate handling of alerts based on alert type and/or time of day, and/or the like.

The alert destination status detector 176 detects whether an alert destination, such as the above-describe enhanced performance reproduction devices 310 and 320 (FIG. 1), are on and may receive an alert. Based on information from the profile database 174 and/or the alert destination status detector 176, the controller 172 determines an appropriate device to which an alert should be transmitted first, second, third etc. In other words, the controller 172 intelligently determines an alert sequence. It should be appreciated that there may be situations in which not all of the available alert devices are included in a given sequence. For example, the profiles in the profile database 174 may indicate that an end-user does not wish to be alerted of certain events at certain times, such as when the end-user is on vacation and the event is not an emergency.

It should be appreciated that the intelligent processor 100 may transmit an alert to one or more of available alert devices simultaneously.

Figure 4:
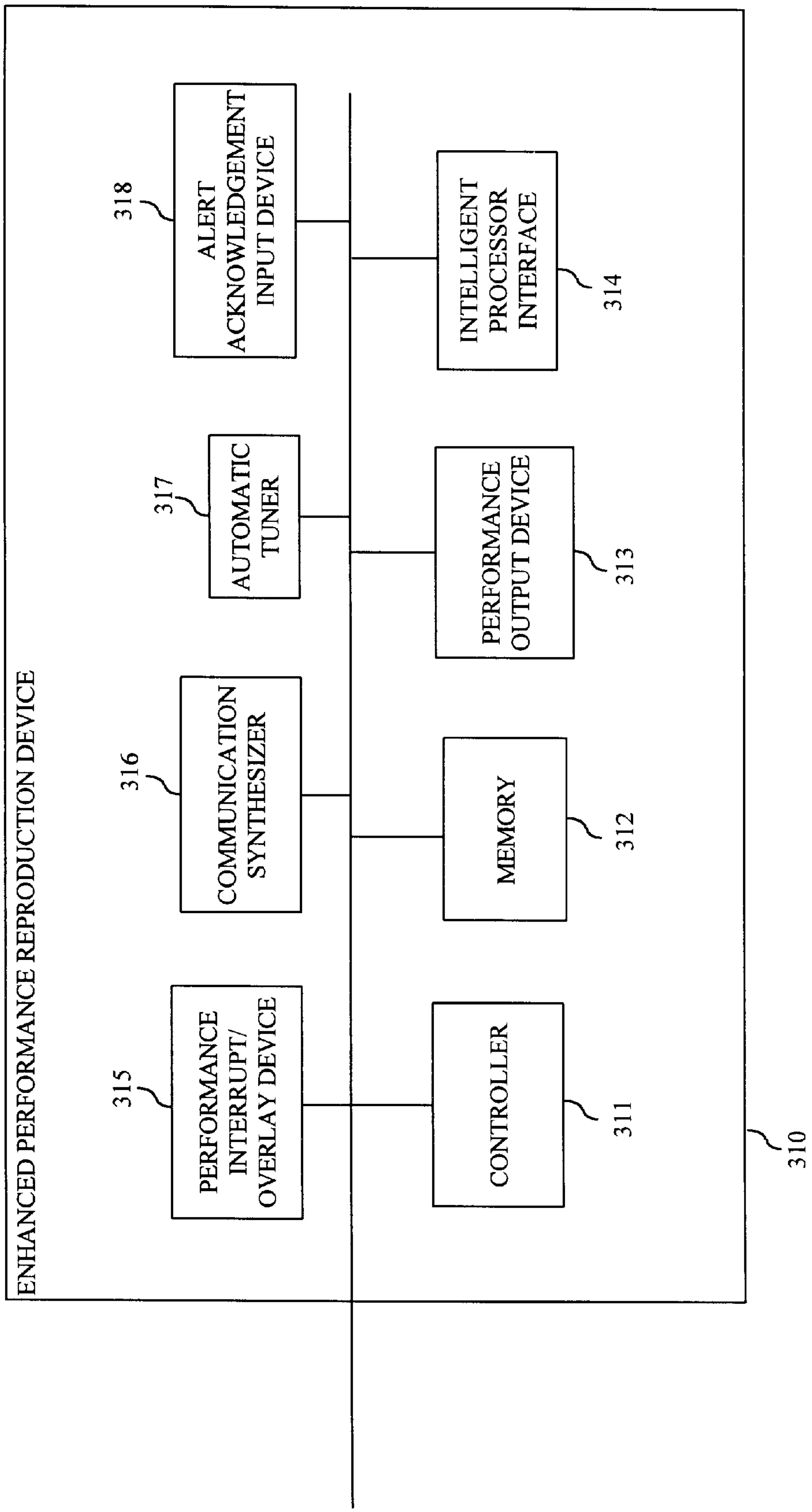
FIG. 4 shows an exemplary block diagram of an enhanced performance reproduction device.

FIG. 4 shows an exemplary block diagram of the enhanced performance reproduction device 310. The enhanced performance reproduction device 310 may include a controller 311, a memory 312, a performance output device 313, an intelligent processor interface 314, a performance interrupt/overlay device 315, a communication synthesizer 316, an automatic tuner 317 and an alert acknowledgment input device 318.

The performance output device 313 is, for example, a radio speaker or a television monitor and speaker. The enhanced performance reproduction device 310 normally receives network programming, such as radio or television talk shows, movies, songs or the like, through the intelligent processor interface 314, and outputs such performances through the performance output device 313. The intelligent processor interface 314 may, for example, be a Customer Premises Equipment (CPE) such as a Multimedia Terminal Adapter (MTA), Broadband Telephony Interface (BTI), Set Top Box (STB), Radio Frequency (RF) interface, cable modem, or the like.

When the intelligent processor 100 receives a notification as described above, the above-described alert destination status detector 176 (FIG. 3) queries the enhanced performance reproduction device 310 to determine whether it is on, e.g., currently outputting a performance. If the enhanced performance reproduction device 310 is on, the intelligent processor 100 transmits an alert via the intelligent processor interface 314.

The performance interrupt/overlay device 315, under control of the controller 311, either completely interrupts the current performance in order to transmit the alert, or overlays the alert onto the current performance, such as by a background beep, a text message on the television screen, or the like. If necessary or desired, the communication synthesizer 316 generates a synthesized version of the alert. For example, if the alert is received in text format, the communication synthesizer 316 may generate a synthesized voice reproduction of the alert. It should be appreciated that the communication synthesizer may operate in conjunction with the communication format converter 130 (FIG. 2), or may even be replaced by the communication format converter 130.

If necessary or desired, the automatic tuner 317 automatically tunes the enhanced performance reproduction device 310 to a reserved channel or frequency. For example, the automatic tuner 317 may automatically turn the end-user's television set, or the television set of the end-user's relative, whom the end-user is visiting, to channel 1, and a text, audio or video message may appear on the screen.

If the alert is being broadcast via a radio station, for example, the alert may be transmitted on a side band, which is a relatively narrow frequency bandwidth between channels that serves as a buffer so that stations don't overlap. The alert could include a code so that it is only reproduced by the enhanced performance reproduction device 310 when the enhanced performance reproduction device 310 is designated by the code. When an alert is received on the side band, the alert may be output via the performance output device 313, either interrupting or overlaying the current performance as described above.

Using the alert acknowledgment input device 318, the end-user may input an acknowledgment that he or she has received the alert. The alert acknowledgment input device 318 may, for example, include a button on a remote control unit of a television, radio or the like, a keyboard, mouse or other input device of a computer or the like, or a button on a telephone, intercom box or the like. In some cases, a separate input device is not needed for acknowledgment of an alert because the alert is acknowledged automatically, such as when a telephone is answered in response to an alert. If one or more levels of security are provided such that, for example, the end-user is required to input a code, such as a Personal Identification Number (PIN) or the like, in order to receive and/or acknowledge the alert, the alert acknowledgment input device 318 may include a keypad or the like that allows the end-user to input the code.

It should be appreciated that, rather than providing an entire device as the enhanced performance reproduction device 310, an enhancement could be provided to an existing performance reproduction device. For example, a separate device (not shown) having the controller 311, memory 312, intelligent processor interface 314, and performance interrupt/overlay device 315, and possibly one or more of the other components shown in FIG. 4, may be provided to enhance an ordinary performance reproduction device. For example, if the ordinary performance reproduction device is an ordinary car radio or the like, the separate device may be inserted between the radio and antenna.

Figure 5:
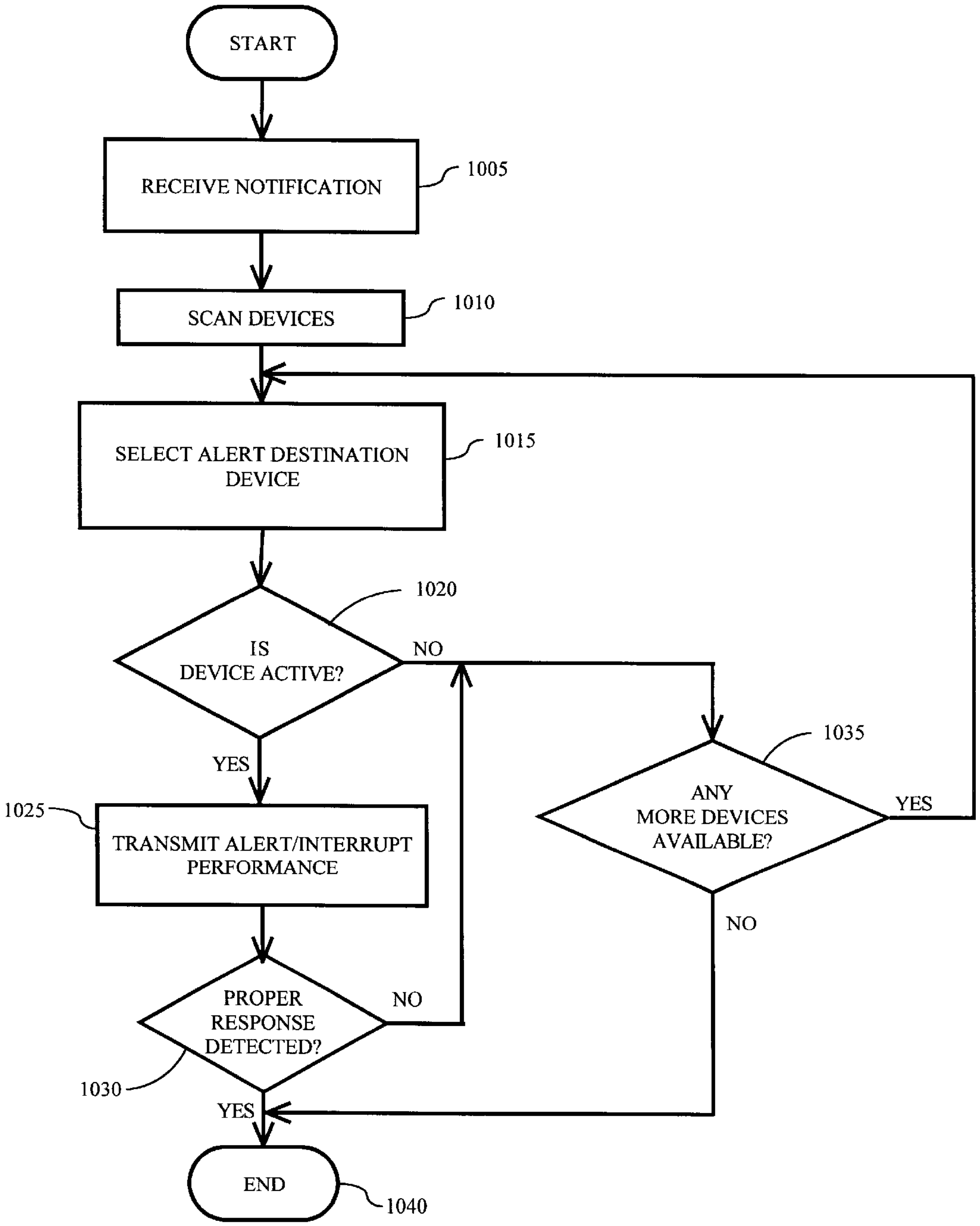
FIG. 5 shows a flowchart of an exemplary process of the intelligent processor.

FIG. 5 shows a flowchart of an exemplary process of the intelligent processor 100. In step 1005, the process receives a notification and goes to step 1010. In step 1010, the process scans devices that may possibly receive an alert, and goes to step 1015. In step 1015, the process selects a first alert destination device, and goes to step 1020.

In step 1020, the process determines whether the selected device is currently active. If the device is active, the process goes to step 1025 and transmits an alert, possibly interrupting a performance currently being generated or transmitted by the device. Otherwise, the process goes to step 1035.

In step 1030, the process determines whether a proper response is detected, e.g., whether the alert has been acknowledged. In some cases, a proper response may be any response. In other cases, a proper response may require the end-user to input a code, such as a Personal Identification Number (PIN) or the like, in order to verify that the responding party is the end-user or some other authorized person. If the alert has been acknowledged, the process goes to step 1040 and ends. Otherwise, the process goes to step 1035.

In step 1035, the process determines whether any more devices are available. If any more devices are available, the process returns to step 1015, selects a next device, and repeats steps 1015–1035. Otherwise, the process goes to step 1040 and ends.

Figure 6:
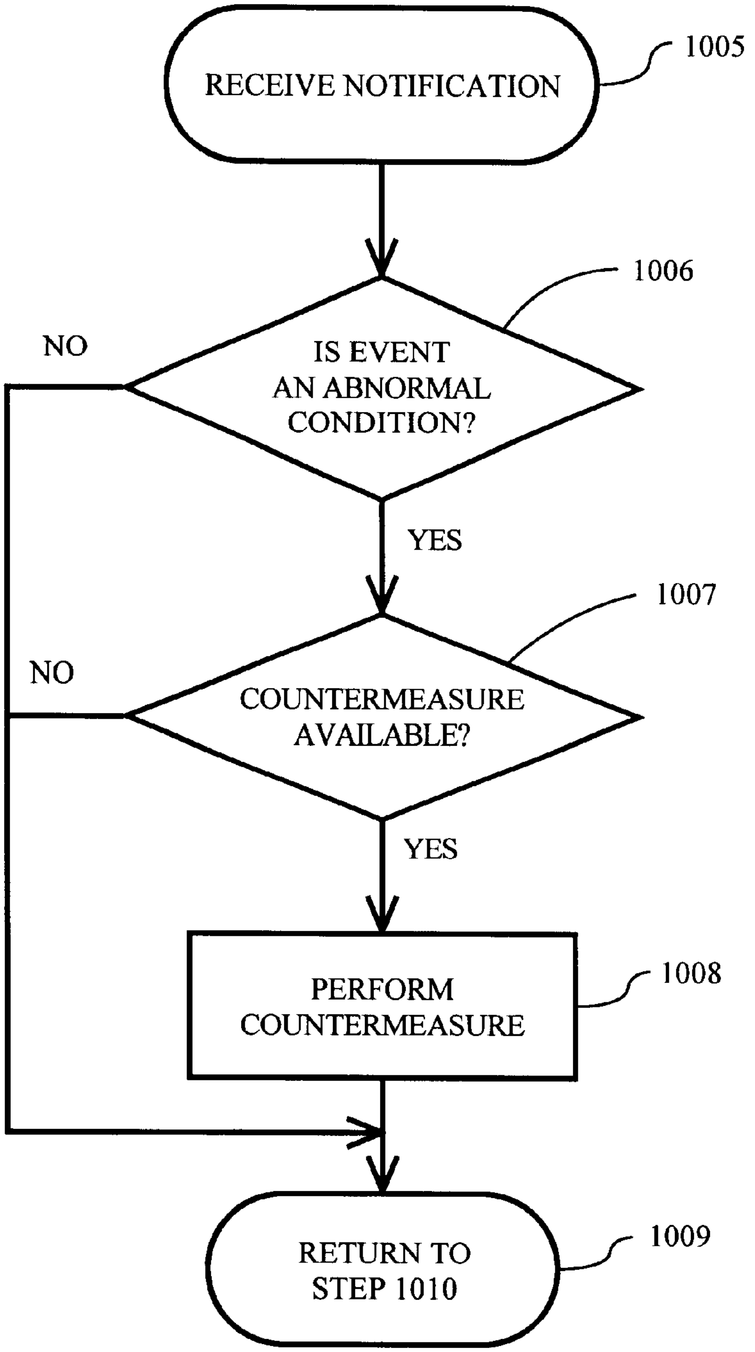
FIG. 6 shows a flowchart of performing a countermeasure.

FIG. 6 shows a flowchart of performing a countermeasure. The process of FIG. 6 begins with the "receive notification" step 1010 of FIG. 5, and goes to step 1006. In step 1006, the process determines whether the notification indicates an abnormal condition. If the notification does not indicate an abnormal condition, the process goes to step 1009 and returns to step 1010 of FIG. 5. If the notification does an abnormal condition, the process goes to step 1007 and determines whether a countermeasure is available.

If a countermeasure is not available, the process goes to step 1009 and returns to step 1010 of FIG. 5. If a countermeasure is available, the process goes to step 1008, performs the countermeasure, and then goes to step 1009 and returns to step 1010 of FIG. 5.

Figure 7:
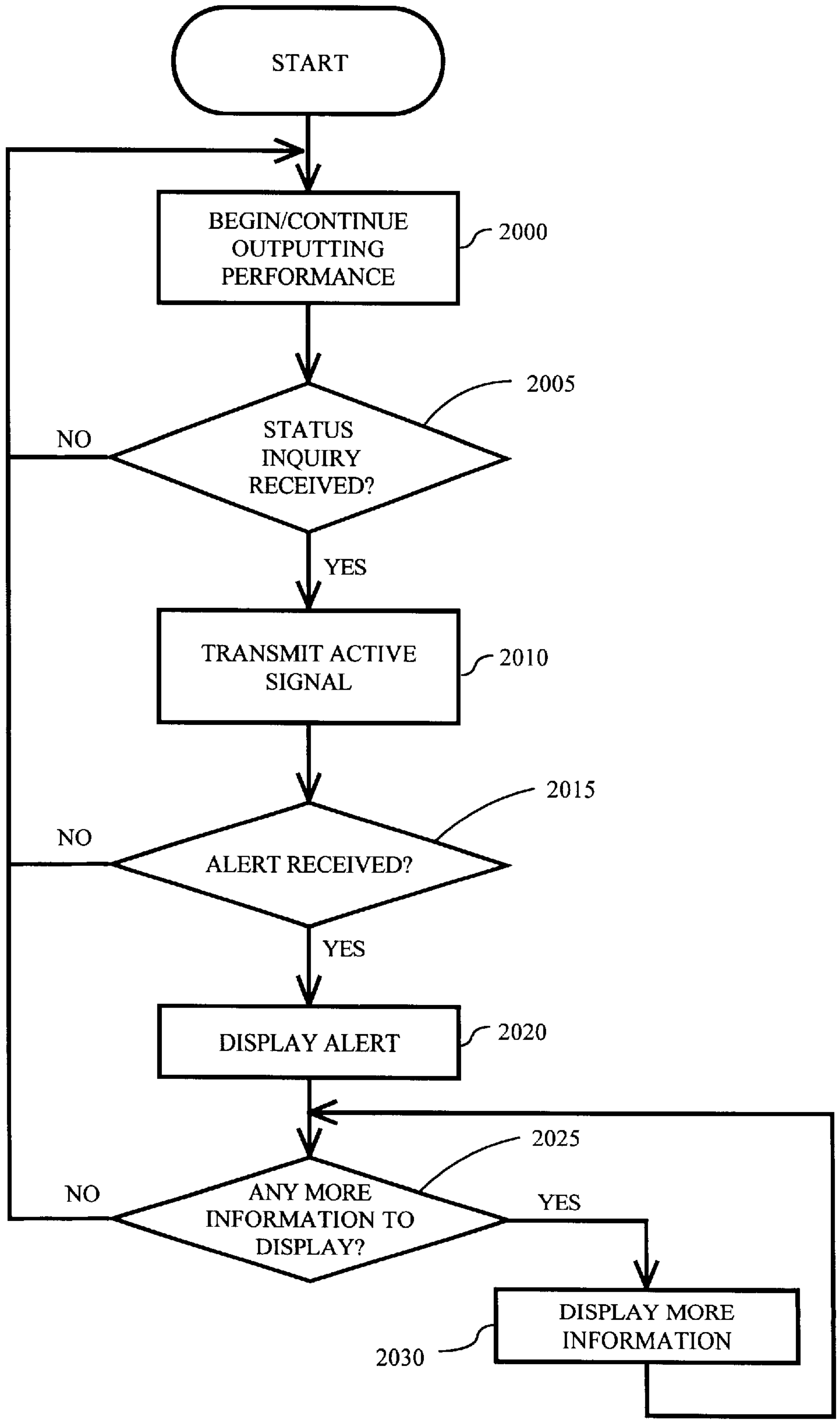
FIG. 7 shows a flowchart of an exemplary process of the enhanced performance reproduction devices.

FIG. 7 shows a flowchart of an exemplary process of the enhanced performance reproduction devices 310 and 320. In step 2000, the process begins outputting a performance and goes to step 2005. In step 2005, the process determines whether a status inquiry has been received. If a status inquiry has been received, the process goes to step 2010. Otherwise, the process returns to step 2000 and repeats steps 2000–2005.

In step 2010, the process transmits an active signal. This active signal indicates that the enhanced performance reproduction device 310 or 320 is active and can receive/display an alert and/or message. The process then goes to step 2015 and determines whether an alert has been received. If an alert has been received, the process goes to step 2020. Otherwise, the process returns to step 2000 and repeats steps 2000–2015.

In step 2020, the process displays the alert, e.g., in an audio, visual and/or other-sensory format, and goes to step 2025. In step 2025, the process determines whether there is any more information, such as a message or the like, to be displayed. If there is any more information, the process goes to step 2030. Otherwise, the process returns to step 2000 and repeats steps 2000–2025.

In step 2030, the process displays more information and goes to and repeats step 2025.

The above-described process may repeated continuously while the enhanced performance reproduction device 310 or 320 is active.

It should be appreciated that some of the above-mentioned steps may be omitted. For example, steps 2005 and 2010 may be omitted if, for example, the intelligent processor 100 transmits an alert simultaneously to a plurality of devices without checking whether any of the devices are active, or if the intelligent processor 100 can determine by some method other than direct query that the enhanced performance reproduction device 310 or 320 is active (e.g., by sensing electrical current flow to the device 310 or 320, or the like).

While the invention has been described in conjunction with the specific embodiments described above, many equivalent alternatives, modifications and variations will become apparent to those skilled in the art once given this disclosure. Accordingly, the exemplary embodiments of the invention as set forth above are considered to be illustrative and not limiting. Various changes to the described embodiments may be made without departing from the spirit and scope of the invention.

For example, when the intelligent processor 100 scans an initial list of devices, one or more of these devices may be alert-incapable devices, i.e., devices that aren't adapted to receive or output an alert at all, such as a bedroom light, a kitchen appliance, etc. The status of such devices would help the intelligent processor 100 to determine whether to send an alert to an alert-capable device that is somehow associated with the scanned device, such as by being in the same room, for example. For example, if a bedroom light were detected by the intelligent processor 100 to be on, then it could be assumed that an end-user was present in the bedroom, and an alert could then be transmitted to a device, e.g., an intercom, located in the bedroom.

Furthermore, although embodiments have been described in which the intelligent processor 100 determines a status of a potential alert device before transmitting the alert, this does not limit the invention. The intelligent processor 100 may automatically transmit the alert to an alert device without first determining its status. For example, when the alert device is an intercom, it is normally in a passive state—i.e., it not normally outputting information, but rather is waiting for information to output. Therefore, the intelligent processor 100 may assume that the intercom is available to output an alert, and automatically transmit the alert to the intercom without first sending a query to determine its status.

What is claimed is:

1. An intelligent alerting method, comprising:

receiving a notification;

detecting whether the notification indicates an abnormal event and performing a countermeasure that addresses the abnormal event when the notification indicates an abnormal event;

scanning one or more scannable devices including at least one of (a) one or more potential alert devices that can potentially receive and output an alert and (b) one or more alert-incapable devices that are not designed to receive an alert;

generating, based on a result of the scanning of the one or more scannable devices, an alert device list of one or more alert devices that can receive an alert; and transmitting an alert to an alert device included in the alert device list.

2. An intelligent alerting device, comprising a controller that:

receives a notification;

detects whether the notification indicates an abnormal event and performs a countermeasure that addresses the abnormal event when the notification indicates an abnormal event;

scans one or more scannable devices including at least one of (a) one or more potential alert devices that can potentially receive and output an alert and (b) one or more alert-incapable devices that are not designed to receive an alert;

generates, based on a result of the scanning of the one or more device, an alert device list of one or more alert devices that can receive an alert; and transmits an alert to an alert device included in the alert device list.

3. A method, comprising:

receiving a notification which indicates an abnormal;

performing a countermeasure that addresses the abnormal event scanning one or more potential alert devices that can potentially receive and output an alert;

generating, based on a result of the scanning of the one or more scannable devices, an alert device list of one or more alert devices that can receive an alert; and transmitting an alert to an alert device included in the alert device list.

* * * * *